H. E. CHOREBANIAN.
FENDER FOR VEHICLES.
APPLICATION FILED APR. 26, 1917.

1,269,786.

Patented June 18, 1918.
2 SHEETS—SHEET 2.

INVENTOR
Hampar E. Chorebanian

WITNESSES

BY

ATTORNEY

UNITED STATES PATENT OFFICE.

HAMPAR E. CHOREBANIAN, OF NEWBURYPORT, MASSACHUSETTS.

FENDER FOR VEHICLES.

1,269,786.

Specification of Letters Patent.

Patented June 18, 1918.

Application filed April 26, 1917. Serial No. 164,734.

*To all whom it may concern:*

Be it known that I, HAMPAR E. CHOREBANIAN, a citizen of the United States, residing at Newburyport, in the county of Essex and State of Massachusetts, have invented certain new and useful Improvements in Fenders for Vehicles, of which the following is a specification.

This invention relates to an improvement in automobiles and particularly to a fender for the front of such vehicle, and has for its primary object the provision of an attachment for an automobile which will fend an object struck to one side or the other and cause said object to be thrown beyond the wheels of the vehicle. The invention furthermore is of simple construction and of such design as to permit its attachment to automobiles of all types and will operate equally well when so applied.

With the above as the principal objects in view the invention consists in the novel construction, combination, and arrangement of parts hereinafter described, pointed out in the appended claims, and illustrated in the accompanying drawings, in which—

Fig. 4 is a perspective view showing a detail of the invention, and

Fig. 5 is a plan view partly in section of a portion of the front end of an automobile showing a modification.

Figure 1:
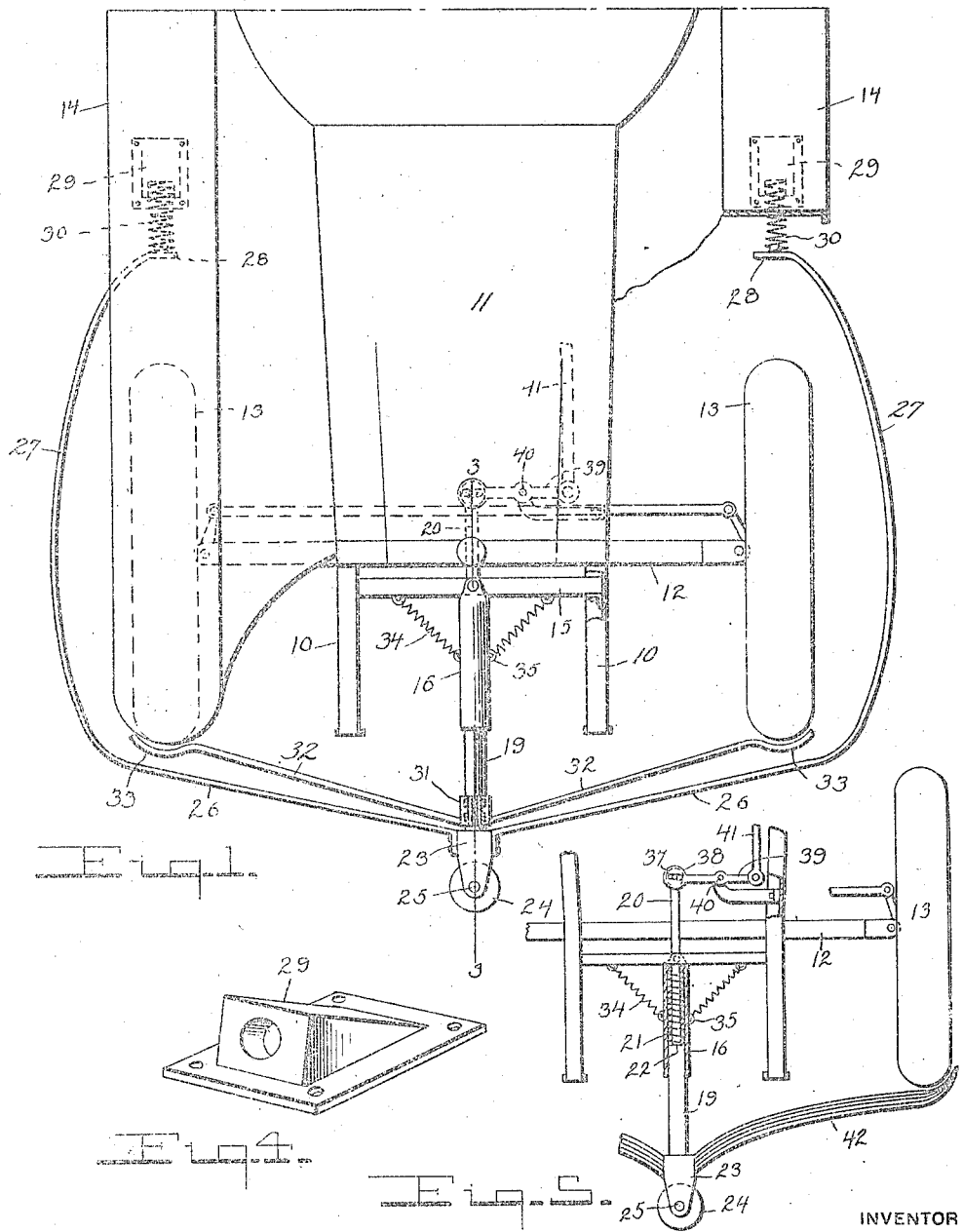
Figure 1 is a top plan view of the forward part of an automobile with the fender applied thereto.
Figure 2:
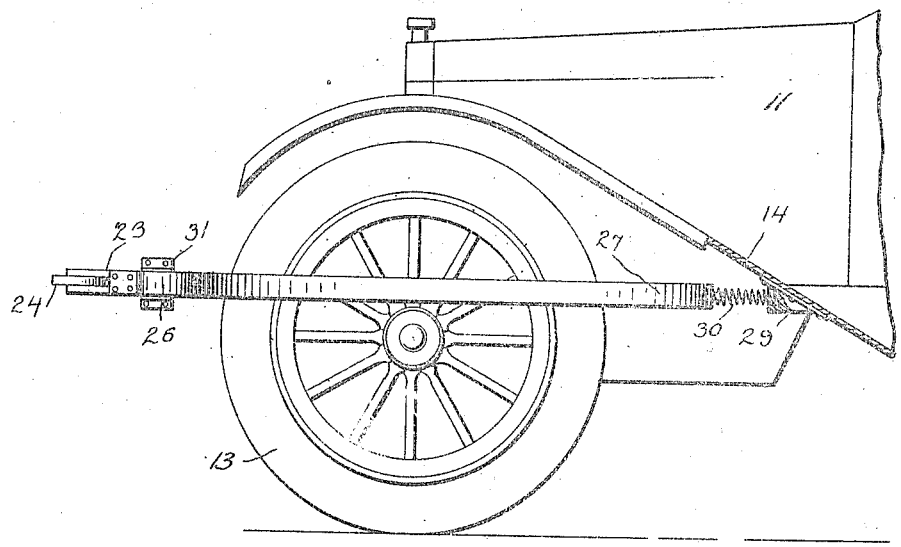
Fig. 2 is a side elevation of the same parts.
Figure 3:
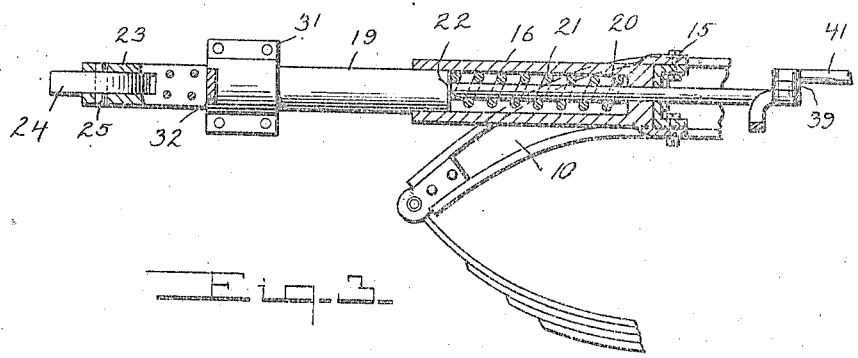
Fig. 3 is a detail sectional view on the line 3—3 of Fig. 1.

In the drawings 10 indicates the side beams of an automobile chassis upon the front ends of which is mounted a hood 11 that covers the motor which drives the vehicle. Below the chassis is the front axle 12 supported by wheels 13 and overlying the said wheels are the usual mud guards 14. The above parts are common to automobiles and need no further detail description.

Mounted in the central longitudinal line of the chassis in any suitable manner, but here shown as pivoted upon a cross bar 15 extending between the forward ends of the side beams 10, is a horizontal forwardly projecting socket 16, the rear end of which is furnished with ears that extend above and below the cross bar and are pivoted thereto by bolts which permit the socket to swing in a horizontal plane when subjected to transverse pressure, but which under normal conditions is held in the central line of the car by two springs 34 connected to lugs 35 on opposite sides of the socket midway its ends and to the cross bar 15. Slidable within the socket 16 and projecting forwardly from the end of the same is a stem 19 having a reduced portion 20 on its rear end within the socket around which portion is placed a coil spring 21 that bears at its ends against the bottom of the socket and a shoulder 22 on the stem for the purpose of pressing the stem forwardly to yieldingly resist any pressure tending to force said stem rearwardly. The reduced portion 20 of the stem passes through the rear end of the socket 16 and a perforation in the cross bar 15 and serves to guide the stem in its longitudinal movement. The terminal end 36 of the reduced portion 20 is perforated for a pivot pin 37 that connects the stem 19 in any convenient way with an emergency brake trip. One way of making this connection, and shown in the drawing, comprises a link 38 connected by pivot pin 37 to the stem terminal 36 and also to one end of a rocking lever 39 pivoted at 40 to the motor car frame. A rod 41 extends from the other end of the rocking lever to the emergency brake device not shown. The stem 19 extends a suitable distance in advance of the socket 16 and terminates at its forward end with a head 23 bifurcated at its extreme end to receive a roller 24 rotatably mounted on a vertical pivot 25 supported in said bifurcations. Bolted against each side of the head 23 in rear of the roller 24 is one end of a guard strap or band 26, these bands extending laterally from the head and rearwardly across the front of the vehicle to the wheels 13, there to curve backwardly as at 27 around and past the sides of the wheels to the rear thereof and then inwardly behind said wheels as at 28. Between the ends 28 of the bands 26 and the mud guards 14, or lugs 29 thereon are compression springs 30 that tend to hold the bands forward in their normal position but permit said bands to yield rearwardly when meeting an obstruction.

Embracing the stem 19 immediately in rear of the head 23 is a two-part coupling 31 connected by bolts as shown, each coupling part having rigidly secured thereon an arm 32 that extends laterally toward the wheel 13 of the same side and at its end is curved around the periphery as shown at 33, in position to bear upon the wheel and serve as a brake when the fender is forced rearwardly.

In use, the fender is applied to an automobile as shown and should the same strike an object, the roller 24 turning on its pivot will carry the object to one side or the other of the center of the automobile against the strap or band 26, and, following the direction of the latter to the side of the car, the object will be carried around the wheel and prevented from falling in front of, or striking the same, the band itself through the springs 30 yielding rearwardly under pressure of the object. At the same time the fender encounters an object, the stem 19 will move rearwardly in the socket 16, compressing the spring 21 and through the connection with the rocking lever 39, operate the emergency brake trip to set the emergency brake if such be called for. The same movement of the stem 19 will cause the ends 33 of the arms 32 to contact with the wheels and serve as a brake to stop the forward movement of the vehicle.

A modified form of fender is shown in Fig. 5 and comprises a series of spring leaves 42 connected together and curved as shown, and secured on each side of the stem head 23 to extend in advance of the front wheels 13.

What I claim is:

1. In a fender, the combination with a vehicle, a horizontal telescopic stem mounted on the front thereof and projecting forwardly in the center line of the vehicle, resilient means for maintaining the same in a forward position but permitting rearward movement under pressure, a horizontal rotatable roller mounted on the forward end of said stem, and laterally projecting wheel fenders secured to the stem.

2. In a fender, the combination with a vehicle, a horizontal telescopic stem mounted on the front thereto to swing transversely and projecting forwardly in the center line of the vehicle, balanced resilient means on opposite sides of the stem to maintain the latter in a normal intermediate position, resilient means on the stem for maintaining the same in the forward position but permitting rearward movement under pressure, an anti-friction wheel mounted on the forward end of said stem, and laterally projecting wheel fenders secured to the stem and extending around the front and sides of the vehicle wheels.

3. A fender for vehicles comprising a forwardly projecting horizontal telescopic stem adapted to move rearwardly and swing laterally to opposite sides of the vehicle, resilient means for resisting said rearward movement, other resilient means for holding the stem in a median position, a horizontally rotatable roller mounted in the forward end of said stem, and a strap or band secured to each side of the stem in rear of the roller and extending laterally across the front and around the wheels of the vehicle.

4. A fender for vehicles comprising a forwardly projecting horizontal stem movable rearwardly, resilient means for resisting said rearward movement, a roller mounted in the forward end of said stem, a strap or band secured on each side of said stem in rear of the roller and extending laterally around the front, side and rear of the front wheels of the vehicle, and resilient means acting on the rear ends of said bands for holding them in a forward position.

5. A fender for vehicles comprising a horizontal forwardly projecting socket adapted to swing toward either side of the vehicle, balanced resilient means on opposite sides of said socket to maintain it in a median position, a stem slidable in said socket and extending beyond the front of the same, a roller mounted in the forward end of said stem, resilient means within the socket tending to force the stem in a forward direction, straps secured to the stem in rear of the roller and extending laterally therefrom and around the front wheels, and brake means for the front wheel fixed to said stem.

6. A fender for vehicles comprising a forwardly extending horizontal stem mounted to swing transversely of the vehicle and resiliently supported against rearward movement, a balanced spring connected to the stem on each side to normally maintain it in the median line of the vehicle, and a fending wheel device mounted on the forward end of the stem.

7. A fender for vehicles comprising a forwardly projecting horizontal socket pivotally mounted on the frame of the vehicle to swing transversely thereof, a stem slidable in said socket and projecting beyond each end thereof, fending means secured on the forward end of said stem, means connected to the rear end for operating the emergency brake trip, resilient means within the socket tending to force the stem in a forward direction, and springs secured to opposite sides of the socket and to the vehicle frame to normally hold said socket in the median line of the vehicle.

In testimony whereof I affix my signature in presence of two witnesses.

HAMPAR E. CHOREBANIAN.

Witnesses:
 JOHN KERKORION,
 NATHANIEL N. JONES.